(12) United States Patent
Mbarki

(10) Patent No.: US 6,721,882 B1
(45) Date of Patent: Apr. 13, 2004

(54) METHOD AND APPARATUS FOR WARM STARTING A SYSTEM WHERE THE SYSTEM INCLUDES REGION(S) OF SOFTWARE CODE INCAPABLE OF WARM STARTING

(75) Inventor: Imed E. Mbarki, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,043

(22) Filed: Aug. 30, 1999

(51) Int. Cl.[7] .............................................. G06F 15/177
(52) U.S. Cl. .............................................. 713/2; 713/1
(58) Field of Search ........................... 713/1, 2; 714/10, 714/11, 38

(56) References Cited

U.S. PATENT DOCUMENTS

| | | |
|---|---|---|
| 4,860,196 A | 8/1989 | Wengert |
| 5,115,511 A | 5/1992 | Nilsson et al. |
| 5,155,729 A * | 10/1992 | Rysko et al. ................... 714/11 |
| 5,214,652 A * | 5/1993 | Sutton ........................ 714/10 |
| 5,361,365 A | 11/1994 | Hirano et al. |
| 5,634,000 A | 5/1997 | Wicht |
| 5,634,079 A * | 5/1997 | Buxton ........................ 710/72 |
| 5,852,630 A | 12/1998 | Langberg et al. |
| 5,878,264 A * | 3/1999 | Ebrahim ...................... 713/323 |
| 5,935,242 A * | 8/1999 | Madany et al. ................. 713/1 |
| 6,061,788 A * | 5/2000 | Reynaud et al. ............... 713/2 |
| 6,247,169 B1 * | 6/2001 | DeLong ........................ 717/4 |
| 6,272,626 B1 * | 8/2001 | Cobbett ....................... 713/2 |
| 6,314,532 B1 * | 11/2001 | Daudelin et al. ............. 714/38 |

FOREIGN PATENT DOCUMENTS

| | | | |
|---|---|---|---|
| EP | 0661632 A | * | 11/1994 |
| JP | 405298136 A | * | 11/1993 |

OTHER PUBLICATIONS

"Initial Machine Load Process for Personal Computer Network System", IBM TDB, Sep. 1993, vol. 36, pp. 541–542.*

* cited by examiner

Primary Examiner—Thomas Lee
Assistant Examiner—Chun Cao

(57) ABSTRACT

This invention relates to a method and apparatus for warm starting a system where the system includes region(s) of software code incapable of warm starting. More particularly, the invention is directed to a warm starting routine that includes determining in which of a plurality of regions of the software code that the code was being executed when an initiation of a warm start routine occurred. The determination is based, in a preferred embodiment, on the status of flags associated with the regions of the software code. Based on the results of the determination, the method of the present invention proceeds in a variety of defined manners to return the system to normal operation.

16 Claims, 3 Drawing Sheets

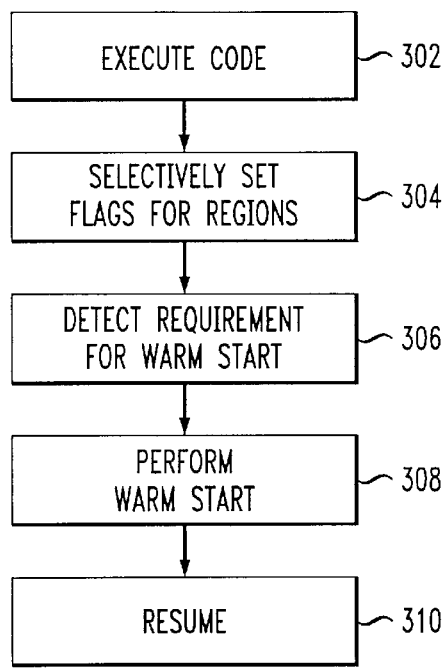
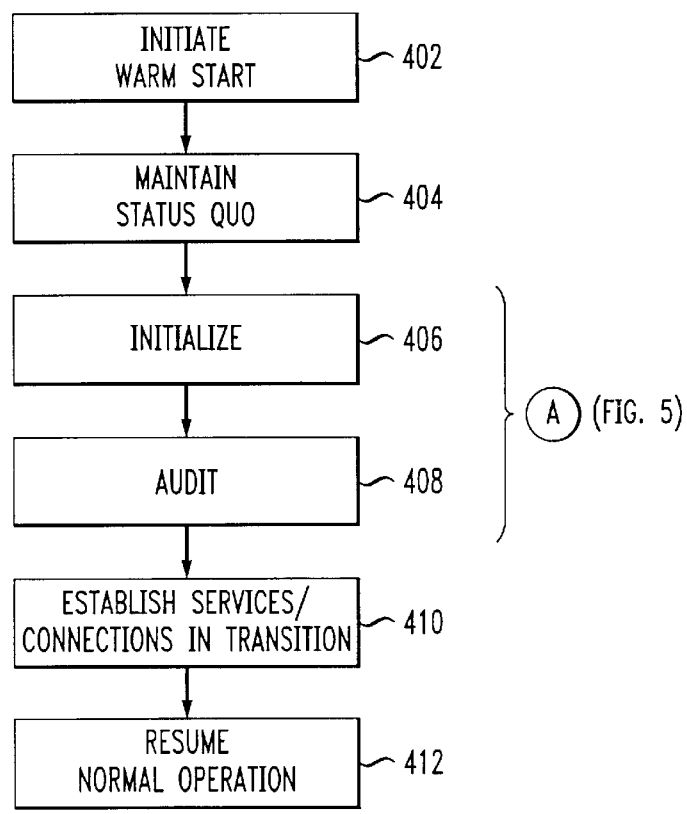

METHOD AND APPARATUS FOR WARM STARTING A SYSTEM WHERE THE SYSTEM INCLUDES REGION(S) OF SOFTWARE CODE INCAPABLE OF WARM STARTING

BACKGROUND OF THE INVENTION

This invention relates to a method and apparatus for warm starting a system where the system includes region(s) of software code incapable of warm starting. More particularly, the invention is directed to a warm starting technique that includes determining in which of a plurality of regions of the software code that the code was being executed when an initiation of a warm start occurred. The determination is based, in a preferred embodiment, on the status of flags associated with the plurality of regions of the software code. Based on the results of the determination, the method of the present invention proceeds in a variety of defined manners to return the system to normal operation.

While the invention is particularly directed to the art of warm starting software in a particular environment to support redundancy in a communication system, and will be thus described with specific reference thereto, it will be appreciated that the invention may have usefulness in other fields and applications. For example, the invention may be used in any application where software advantageously uses warm starting techniques.

By way of background, computer systems—such as those used in the field of telecommunications—typically include a control processor for controlling the operation of the system. If the control processor fails, all of the systems that it supports necessarily fail. A known approach for dealing with this difficulty is to provide a second, or redundant, control processor to the system. In these circumstances, if the main or active control processor fails, the redundant control processor assumes control in such a way so that the system is not impacted by the change of control processors to any great extent. Using so called "redundancy" techniques, processes in the system that are running at the time of failure can be maintained.

One way to support redundancy is to use warm starting techniques to facilitate the changeover of processor control. Generally, during a warm start, only the operating system is started or restarted. The remaining portions of the software, which may require some recovery from failure errors, are nonetheless able to maintain information about the rest of the system. Hardware is generally not reinitialized during a warm start. This is all in contrast to a "cold" start which typically requires a total rebooting of the system (hardware and software) and loss of all information in the system.

Warm starts can occur at any point during execution of code that is running in the system, including the situation where processor control is being changed from a main control processor to a redundant control processor in a redundant system. It is to be further appreciated that warm starts can also occur in the main processor when no control changeover occurs, whether or not a redundant processor is available. This being the case, warm starts sometimes occur when critical regions of a code are being executed, thus necessitating special treatment of the data and/or code for recovery purposes. In addition, in circumstances where regions of the code were not written to support warm starting, the entire system becomes incapable of being warm started.

The present invention contemplates a new and improved method and apparatus for warm starting a system utilizing software incapable of warm starting that resolves the above-referenced difficulties and others.

SUMMARY OF THE INVENTION

A method and apparatus for warm starting a system where the system includes regions of software code incapable of warm starting are provided.

In one aspect of the invention, the method comprises steps of initiating a warm start routine, terminating connections to external devices, initializing the warm start of the system by determining in which of the plurality of regions the code was being executed when the initiating occurred and, if the code of the first region was being executed when the initiating occurred, executing the warm start routine, or, if the code of the second region was being executed when the initiating occurred, reinitializing the code of the second region, auditing the system to determine whether other regions of the plurality of regions of the code were dependent on the code of the second region when the initiating occurred and reinitializing the other regions if the code of the second region is reinitialized, and reestablishing the external connections.

In a more limited aspect of the invention, the determining in which of the plurality of regions the code was being executed comprises determining the status of flags associated with the first region and the second region, the flags being set while the code is being executed in each region and subsequently reset.

In a still more limited aspect of the invention, the code includes a third region and the initializing includes cold starting the system if the code is executing in the third region when the initiating occurred.

In a still more limited aspect of the invention, the determining in which of the plurality of regions the code was being executed comprises determining the status of flags associated with the first region, the second region and the third region, the flags being set while the code is being executed in each region and subsequently reset.

In a still more limited aspect of the invention, the code includes another region and the initializing includes executing the warm start routine and subsequently restructuring data being manipulated if the code is executing in that region when the initiating occurred.

In a still more limited aspect of the invention, the determining in which of the plurality of regions the code was being executed comprises determining the status of flags associated with the regions, the flags being set while the code is being executed in each region and subsequently reset.

In another aspect of the invention, a method comprises steps of executing the code, selectively setting flags associated with first and second regions of the code when the code is being executed therein such that a flag remains in a set state while the code is being executed in the associated region, resetting each set flag after the code is fully executed in the associated region, initiating a warm start routine, determining which flag was set when the initiating occurred, executing the warm start routine if the flag associated with the first region is set, reinitializing the code of the second region if the flag associated with the second region is set, auditing the system to determine whether other regions of the plurality of regions of the code were dependent on the code of the second region when the initiating occurred, reinitializing the other regions if the code of the second region is reinitialized, and reestablishing the external connections.

In a more limited aspect of the invention, the code includes a third region and the method further comprises steps of selectively setting a flag associated with the third region when the code is being executed therein such that the flag remains in a set state while the code is being executed in the third region and cold starting the system if the flag associated with the third region was set when the initiating occurred.

In a still more limited aspect of the invention, the code includes another region and the method further comprises steps of selectively setting a flag associated with that region when the code is being executed therein such that the flag remains in a set state while the code is being executed in that region and executing the warm start routine and subsequently restructuring data being manipulated if the flag associated with that region was set when the initiating occurred.

In a still more limited aspect of the invention, the code includes a fourth region and the method further comprises steps of selectively setting a flag associated with the fourth region when the code is being executed therein such that the flag remains in a set state while the code is being executed in the fourth region and executing the warm start routine and subsequently restructuring data being manipulated if the flag associated with the fourth region was set when the initiating occurred.

In another aspect of the invention, an apparatus implementing the method of the invention is provided.

The primary advantage of the system according to the present invention is that it provides a technique for allowing a system to warm start to support redundancy even where regions of the software code are not warm startable.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

FIG. 3 is a flowchart illustrating an overall method according to the present invention;

FIG. 4 is a flowchart illustrating a warm start routine according to the present invention; and, FIG. 5 is a flowchart illustrating the initializing and auditing steps of the method of FIG. 4.

DETAILED DESCRIPTION OF THE PREFERRED EMBODIMENTS

Figure 1:
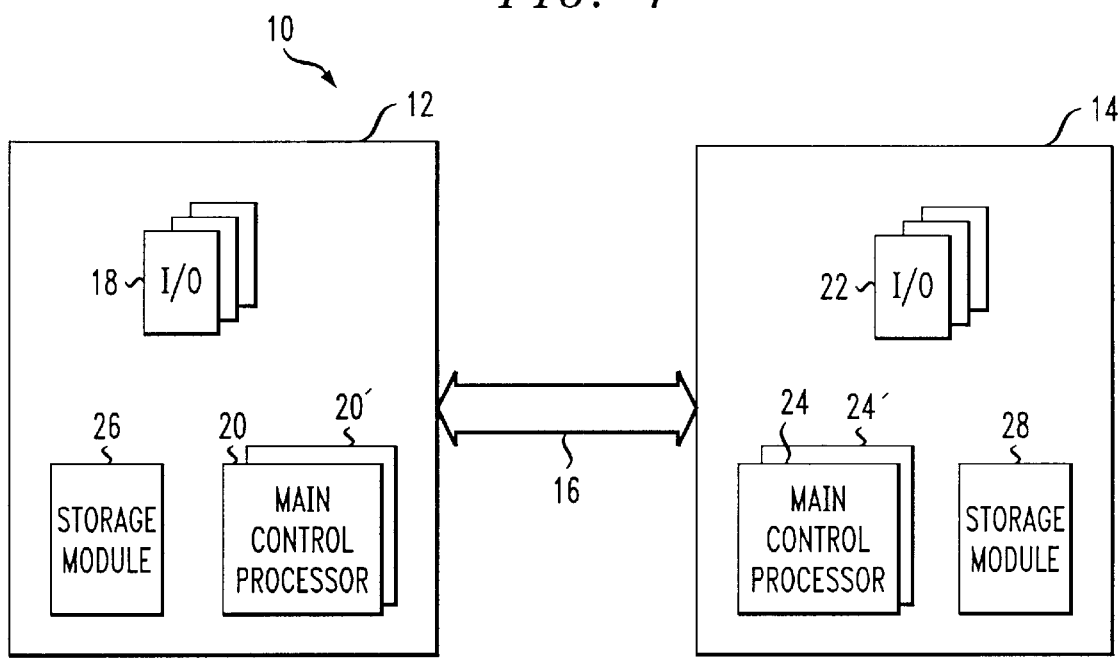
FIG. 1 is a schematic representation of a system to which the present invention may be applied.

Referring now to the drawings wherein the showings are for purposes of illustrating the preferred embodiments of the invention only and not for purposes of limiting same, FIG. 1 illustrates a system in which the present invention may reside. As shown, a communication system 10 includes switches, or switching systems or ATM end points, 12 and 14 connected by a link 16. The switch or system 12 includes, among other elements not shown that are well known to those skilled in the art, input/output cards 18, a main control processor 20, and a redundant control processor 20'. Likewise, the switch or system 14 includes, among other elements not shown that are well known to those skilled in the art, input/output cards 22, a main control processor 24, and a redundant control processor 24'.

Significantly, the link 16 is controlled by code that is stored in storage modules 26 and 28, respectively, of switching elements 12 and 14. In one implementation, the code supports Integrated Link Management Interface or ILMI protocols for controlling the link 16. ILMI protocols are ATM Forum standards that are well known to those skilled in the art.

The processors 20' and 24' are redundant processors positioned and operating such that, if main processors 20 and 24 fail, the redundant processors assume control of the system, including control of the link 16. Use of redundancy techniques is advantageous in a system such as system 10 because if a main processor 20 or 24 fails, without a back-up or redundant processor, the link 16 could also fail. This, in turn, would cause a variety of telecommunications operations that are dependent on the link 16 to fail. As such, to support redundancy in this environment, the processors are preferably capable of warm starting so that the transition of control in the system results in a minimum of difficulties for the system.

Figure 2:
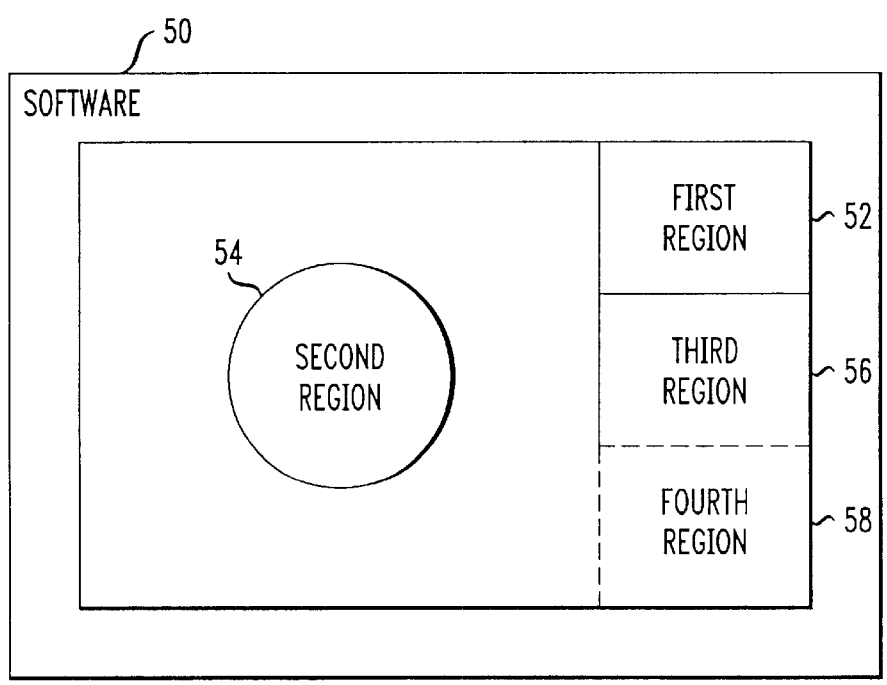
FIG. 2 is a graphic representation of software code to which the present application is applied.

With reference now to FIG. 2, a representation of software such as that stored in storage modules 26 and 28 is shown. Software 50 includes a first region 52, a second region 54, a third region 56, and, in some applications, a fourth region 58. Although a variety of forms and configurations of these regions is possible, in one implementation, the first region 52 includes software that will require no special action to recover after a warm start if a line of code in that region was executing at the initiation of the warm start.

The second region 54 includes code that simply is not written to accommodate warm starting. From a practical standpoint, such code is usually obtained from a source other than the source that provided the remaining portions of the code. As to this second region 54, according to the present invention, if a warm start occurs while a line of code is executing in the second region, the code in only the second region is reinitialized.

The third region 56 includes code that will not recover from a warm start and will cause a cold start to occur (i.e. reboot the whole system) if a warm start occurs while a line of code is executing in that region. The fourth region 58 is code that requires a restructuring of data, particularly linked data, after the warm start process is complete if the code was executing in this region when the warm start was initiated. The region 58 is not included in the ILMI protocol software noted above but is nonetheless, represented for purposes of describing alternative types of code regions to which the present invention may be applied.

Referring now to FIG. 3, an overall method according to the present application is illustrated. The method 300 includes an initial step of executing code (step 302). While the code is executing in manners well known to those skilled in the art, flags corresponding to each region (as described in connection with FIG. 2) of the code are selectively set while the code is being executed in that region. The flag remains set so long as code is being executed in that region. Once the code is completely executed in that particular region, the flag is reset (step 304).

During this process of executing code, operations or errors may occur in the system, e.g. the main control processor, that will require a warm start in the system. As alluded to above, the redundant processor may be warm started to facilitate a changeover of control from the main control processor. Likewise, the main processor may be warm started for a variety of reasons well known in the art. A warm start may be required simply by the action of an individual pulling the control processor card from the switch. In any event, such circumstances are detected by the system (step 306). Subsequently, a warm start operation (as described in connection with FIGS. 4 and 5) is performed on appropriate parts of the system (step 308). Normal operations of the system are then resumed (step 310).

Referring now to FIG. 4, a method 400 for warm starting (generally referred to at step 308) begins with an initiation of the warm start (step 402). This, of course, occurs after the detection of the requirement for a warm start (step 306 in FIG. 3). As those skilled in the art will appreciate, the requirement detected may be, for example, the failure of the main control processor such that the redundant processor requires a warm start to assume control of the system. As discussed, however, other circumstances may also initiate a warm start in the main control processor or redundant control processor as those of skill in the art will appreciate.

At this point, connections to external devices are disabled to maintain the status quo of the system (step 404). That is, the control processor, or card, being warm started stops making new connections, for example, through the link 16 (in FIG. 1) between the switches 12 and 14. However, information on other established connections is maintained. In addition, generally, internal connections within the switch 12 or 14 are maintained.

Next, an initialization is implemented (step 406). During the initialization, it is determined in which of the plurality of regions the code was being executed when the initiation of the warm start occurred. That is, surveying of the flags is accomplished. Depending on the result of this determination, a variety of defined manners of proceeding is accomplished. These will be described in more detail in FIG. 5.

Figure 5:
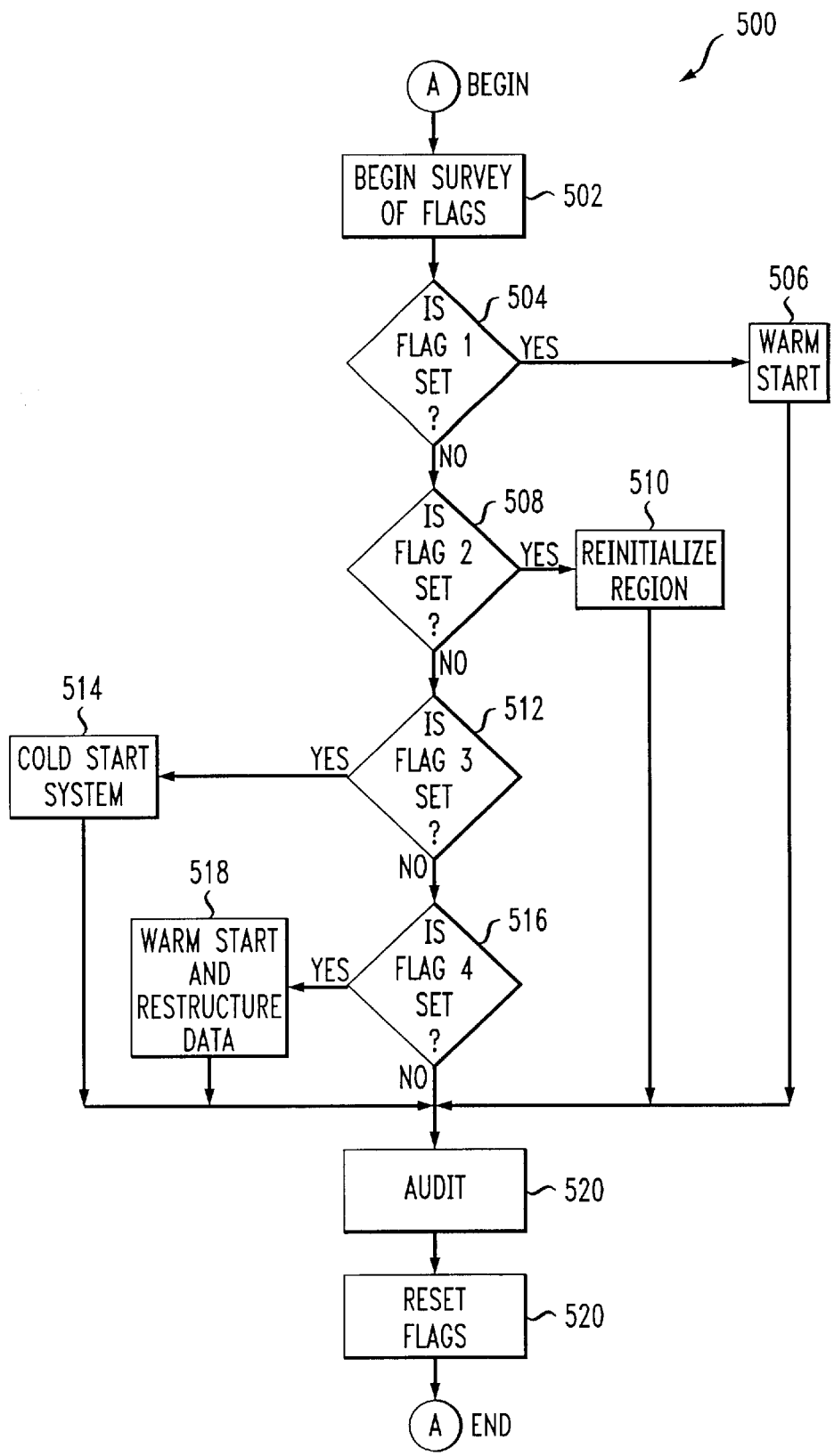

Next, the system is audited to check any activity related to the warm start, which will also be more particularly described in connection with FIG. 5 (step 408). After the audit, services and connections to the system that were in transition at the time of warm start are established or enabled (step 410). Last, normal operations of the system are resumed (step 412).

Steps 406 and 408, in a preferred embodiment, include a surveying of flags associated with each of the software code regions. These steps actually comprise a method 500, as illustrated in FIG. 5, which starts by beginning a survey of the flags (step 502). A determination is first made whether flag 1 is set (step 504). If so, a warm start routine is executed and the code recovers from the warm start without corruption. If flag 1 is not set, a determination is made as to whether flag 2 is set (step 508). If flag 2 is set, the code of only that region is reinitialized (step 510). If flag 2 is not set, a determination is then made whether flag 3 is set (step 512). If flag 3 is set, a cold start or reboot of the system is executed (step 514). If flag 3 is not set, a determination is made whether flag 4 is set (step 516). If so, a warm start is executed; however, execution of the code in this region may require restructuring of data after the warm start (step 518).

After the flag status is surveyed, the system is audited to check related activity (step 520). More particularly, a variety of well known auditing operations are performed but, significantly, if flag 2 was set, and a reinitialization of the code of that particular region was executed, then the system must determine whether other regions of the plurality of regions of code were dependent on the code of that region when the initiating occurred. If so, the code of these other regions must be reinitialized to be consistent with the reinitialization of region 54. After the audit, all of the flags are reset (step 522).

It is to be appreciated that four (4) regions of code and, thus, four (4) flags are described herein as an example only. The invention is equally applicable to code of having less regions or more regions. In addition, the specific example described herein relates to a system that supports redundancy in a telecommunication switch; however, the invention could be applied in any system utilizing warm start techniques.

The invention described herein provides significant advantages over known techniques in that it allows a warm start routine to be implemented even in a system that includes regions of software code that are incapable of warm starting. This is significant because any such region would normally prevent the whole system from taking advantage of warm start techniques.

The above description merely provides a disclosure of particular embodiments of the invention and is not intended for the purposes of limiting the same thereto. As such, the invention is not limited to only the above described embodiments. Rather, it is recognized that one skilled in the art could conceive alternative embodiments that fall within the scope of the invention.

Having thus described the invention, I hereby claim:

1. A method for warm starting in a system, the system including connections to external devices and executable code having a plurality of regions, a first region of the plurality being capable of warm starting and a second region of the plurality being incapable of warm starting, the method comprising steps of:

initiating a warm start routine;

terminating the connections to the external devices;

initializing the warm start of the system by determining in which of the plurality of regions the code was being executed when the initiating occurred and, if the code of the first region was being executed when the initiating occurred, executing the warm start routine, or, if the code of the second region was being executed when the initiating occurred, reinitializing the code of the second region;

auditing the system to determine whether other regions of the plurality of regions of the code were dependent on the code of the second region when the initiating occurred and reinitializing the other regions if the code of the second region is reinitialized; and reestablishing the external connections.

2. The method as set forth in claim 1 wherein the determining in which of the plurality of regions the code was being executed comprises determining the status of flags associated with the first region and the second region, the flags being set while the code is being executed in each region and subsequently reset.

3. The method as set forth in claim 1 wherein the code includes a third region and the initializing includes cold starting the system if the code is executing in the third region when the initiating occurred.

4. The method as set forth in claim 3 wherein the determining in which of the plurality of regions the code was being executed comprises determining the status of flags associated with the first region, the second region and the third region, the flags being set while the code is being executed in each region and subsequently reset.

5. The method as set forth in claim 1 wherein the code includes a third region and the initializing includes executing the warm start routine and subsequently restructuring data being manipulated if the code is executing in the third region when the initiating occurred.

6. The method as set forth in claim 5 wherein the determining in which of the plurality of regions the code was being executed comprises determining the status of flags associated with the first region, the second region and the third region, the flags being set while the code is being executed in each region and subsequently reset.

7. A method adaptable for use with a system including executable code having a first region capable of warm starting and a second region incapable of warm starting, the method comprising steps of:

executing the code;

selectively setting flags associated with the first and second regions of the code when the code is being executed therein such that a flag remains in a set state while the code is being executed in the associated region;

resetting each set flag after the code is fully executed in the associated region;

initiating a warm start routine;

determining which flag was set when the initiating occurred;

executing the warm start routine if the flag associated with the first region is set;

reinitializing the code of the second region if the flag associated with the second region is set;

auditing the system to determine whether other regions of the plurality of regions of the code were dependent on the code of the second region when the initiating occurred;

reinitializing the other regions if the code of the second region is reinitialized; and reestablishing the external connections.

8. The method as set forth in claim 7 wherein the code includes a third region and the method further comprises steps of:

selectively setting a flag associated with the third region when the code is being executed therein such that the flag remains in a set state while the code is being executed in the third region;

cold starting the system if the flag associated with the third region was set when the initiating occurred.

9. The method as set forth in claim 7 wherein the code includes a third region and the method further comprises steps of:

selectively setting a flag associated with the third region when the code is being executed therein such that the flag remains in a set state while the code is being executed in the third region;

executing the warm start routine and subsequently restructuring data being manipulated if the flag associated with the third region was set when the initiating occurred.

10. The method as set forth in claim 8 wherein the code includes a fourth region and the method further comprises steps of:

selectively setting a flag associated with the fourth region when the code is being executed therein such that the flag remains in a set state while the code is being executed in the fourth region;

executing the warm start routine and subsequently restructuring data being manipulated if the flag associated with the fourth region was set when the initiating occurred.

11. An apparatus for warm starting in a system, the system including connections to external devices and executable code having a plurality of regions, a first region of the plurality being capable of warm starting and a second region of the plurality being incapable of warm starting, the apparatus comprising steps of:

means for initiating a warm start routine;

means for terminating the connections to the external devices;

means for initializing the warm start of the system by determining in which of the plurality of regions the code was being executed when the initiating occurred and, if the code of the first region was being executed when the initiating occurred, executing the warm start routine, or, if the code of the second region was being executed when the initiating occurred, reinitializing the code of the second region;

means for auditing the system to determine whether other regions of the plurality of regions of the code were dependent on the code of the second region when the initiating occurred and reinitializing the other regions if the code of the second region is reinitialized; and means for reestablishing the external connections.

12. The apparatus as set forth in claim 11 wherein the means for determining in which of the plurality of regions the code was being executed comprises means for determining the status of flags associated with the first region and the second region, the flags being set while the code is being executed in each region and subsequently reset.

13. The apparatus as set forth in claim 11 wherein the code includes a third region and the means for initializing includes means for cold starting the system if the code is executing in the third region when the initiating occurred.

14. The apparatus as set forth in claim 13 wherein the means for determining in which of the plurality of regions the code was being executed comprises means for determining the status of flags associated with the first region, the second region and the third region, the flags being set while the code is being executed in each region and subsequently reset.

15. The apparatus as set forth in claim 11 wherein the code includes a third region and the means for initializing includes means for executing the warm start routine and subsequently restructuring data being manipulated if the code is executing in the third region when the initiating occurred.

16. The apparatus as set forth in claim 15 wherein the means for determining in which of the plurality of regions the code was being executed comprises means for determining the status of flags associated with the first region, the second region and the third region, the flags being set while the code is being executed in each region and subsequently reset.

* * * * *